(12) United States Patent
Culca

(10) Patent No.: US 7,359,433 B1
(45) Date of Patent: Apr. 15, 2008

(54) DATA TRANSMISSION SYSTEM

(75) Inventor: Stefan-Horea Culca, Lohmar (DE)

(73) Assignee: Moeller GmbH, Bonn (DE)

( * ) Notice: Subject to any disclaimer, the term of this patent is extended or adjusted under 35 U.S.C. 154(b) by 0 days.

(21) Appl. No.: 10/009,051

(22) PCT Filed: Mar. 1, 2000

(86) PCT No.: PCT/EP00/01748

§ 371 (c)(1),
(2), (4) Date: Apr. 22, 2002

(87) PCT Pub. No.: WO00/75795

PCT Pub. Date: Dec. 14, 2000

(30) Foreign Application Priority Data

Jun. 8, 1999 (DE) .................................. 199 26 006

(51) Int. Cl.
*H04B 1/38* (2006.01)
*H04B 3/00* (2006.01)
(52) U.S. Cl. .................. 375/220; 375/257; 375/259
(58) Field of Classification Search ................ 375/219, 375/220, 222, 257, 259
See application file for complete search history.

(56) References Cited

U.S. PATENT DOCUMENTS

| 4,143,239 | A |   | 3/1979 | Hultman et al. ............ 178/68 |
|---|---|---|---|---|
| 4,337,465 | A | * | 6/1982 | Spracklen et al. .......... 370/445 |
| 4,535,421 | A |   | 8/1985 | Duwel et al. ................ 364/900 |
| 5,555,438 | A |   | 9/1996 | Blech et al. ................. 395/850 |
| 5,736,796 | A | * | 4/1998 | Price et al. .................. 307/151 |

FOREIGN PATENT DOCUMENTS

| DE | 2756382 | 7/1978 |
|---|---|---|
| DE | 4111301 | 10/1992 |

* cited by examiner

*Primary Examiner*—David B. Lugo
(74) *Attorney, Agent, or Firm*—Darby & Darby

(57) ABSTRACT

The invention relates to a data transmission system for the serial asynchronous data transmission between two devices (1; 3). The aim of the invention is to provide a secure data transmission system for the communication between two devices that can be produced with as little technical effort as possible. To this end, two circuit parts that are interconnected by means of a two-wire circuit (8) are used which are provided with respective receiver circuit elements (2b; 4b) and respective emitter circuit elements (2a; 4a). The inventive system also comprises a source of current (6) via which a current (1q) can be fed to the data transmission line (8a) so that signal states can be modified depending on the input signals of the circuit parts while at the same time parts of the circuits are supplied with current.

12 Claims, 2 Drawing Sheets

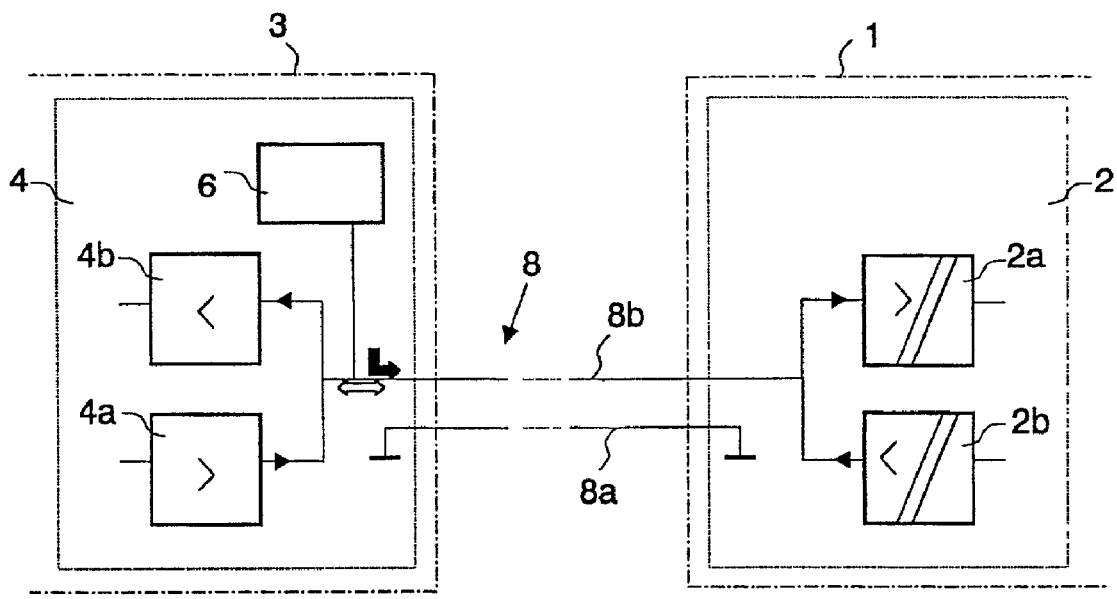
*Fig.1*
*Fig.2*
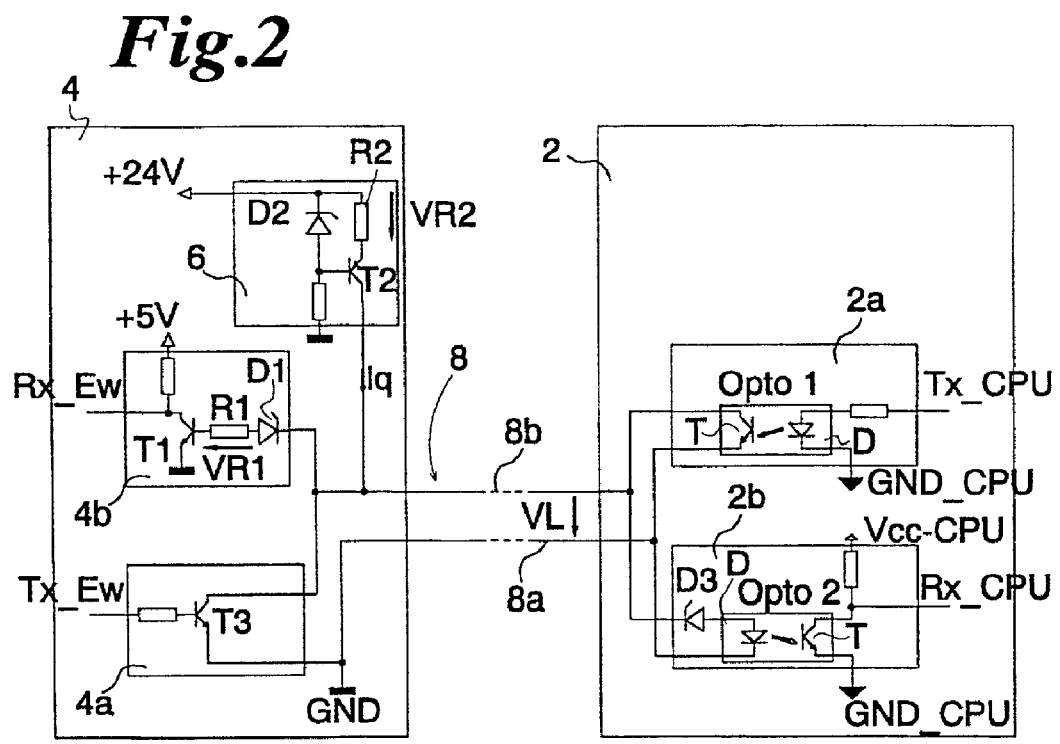

DATA TRANSMISSION SYSTEM

CROSS-REFERENCE TO RELATED APPLICATIONS

This application is a U.S. National Stage Application under 35 U.S.C. §371 of PCT International Application No. PCT/EP00/01748, filed Mar. 1, 2000, which claims priority to German Patent Application DE 199 26 006.0, filed Jun. 8, 1999.

BACKGROUND

The present invention relates to a data transmission system for serial asynchronous data transmission between two devices.

A serial data transmission system of this kind is known, for example, through the ASI bus system (actuator-sensor interface). The stations of this bus system are actuators and sensors of the most different kinds. All devices that are connected to such a system must have an appropriate intelligence in the form of a microcontroller or an ASIC as well as a compatible device interface. The communication between the stations of the bus and the power supply to the stations are carried out via a double-core, unshielded cable. To this end, the data is transmitted in modulated form via the supply voltage. For a reliable data transmission, specially developed ASIC modules are used in the stations of the ASI bus system. In the past, such a design approach has proven to be efficient but is technically too complex and too expensive for smaller systems.

SUMMARY OF THE INVENTION

Therefore, an object of the present invention is to provide a data transmission system which achieves serial asynchronous data transmission with a small technical effort.

The present invention provides a data transmission system for serial asynchronous data transmission between a first unit and a second unit. The data transmission system includes a first circuit part associated with the first unit and a second circuit part associated with the second unit. The first circuit part includes a first transmitter circuit part including a first transmitter terminal; a first receiver circuit part including a first receiver terminal; a first terminal for a data transmission line; and a first terminal for a reference potential line. The second circuit part includes a second transmitter circuit part including a second transmitter terminal; a second receiver circuit part including a second receiver terminal; a second terminal for the data transmission line; and a second terminal for the reference potential line. The second circuit part is interconnectable with the first circuit part via the data transmission line for bidirectional data transmission and via the reference potential line. A current source is provided which is configured for feeding a current into the data transmission line so that a first signal state of the first receiver terminal is capable of being changed as a function of a second signal state of the second transmitter terminal; and a third signal state of the second receiver terminal is capable of being changed as a function of a fourth signal state of the first transmitter terminal.

The power supply to the circuit part, which may be galvanically separated, of the first device, which may be a master device, via the bus side is ensured according to the present invention by feeding a current, in particular a constant current, into the single, bidirectional data transmission line of the system.

For example, in the case of the communication between a master device and a slave device, the power supply to both devices is generally ensured via the power supply unit of the master device.

According to the present invention, the power supply unit of the master device is advantageously relieved by feeding in a current, preferably in the form of a constant current, and by the so implemented supply to the circuit part on the bus side. Due to this, a power supply unit having galvanically separated supply terminals for bus-side and device-side circuit parts of the master device can be dispensed with. In the preferred embodiment of the present invention, the transmitter- and receiver circuit parts of the slave device are designed to have conventional transistors (here n-p-n transistors) and the transmitter- and receiver circuit parts of the master device are designed to have optocouplers which are suitable for the galvanic separation.

The two circuit parts can be designed as separate coupling modules for connection to intelligent switching or control devices, or else as separate coupling modules for coupling control devices with expansion modules which are connectable thereto, or the like.

BRIEF DESCRIPTION OF THE DRAWINGS

Further details and advantages of the present invention will be elaborated upon below based on exemplary embodiments with reference to the drawings, in which:

FIG. 1 shows a schematic representation of a data transmission system according to the present invention;

FIG. 2: shows a schematic representation of an embodiment of a data transmission system according to FIG. 1.

DETAILED DESCRIPTION

Figure 3:
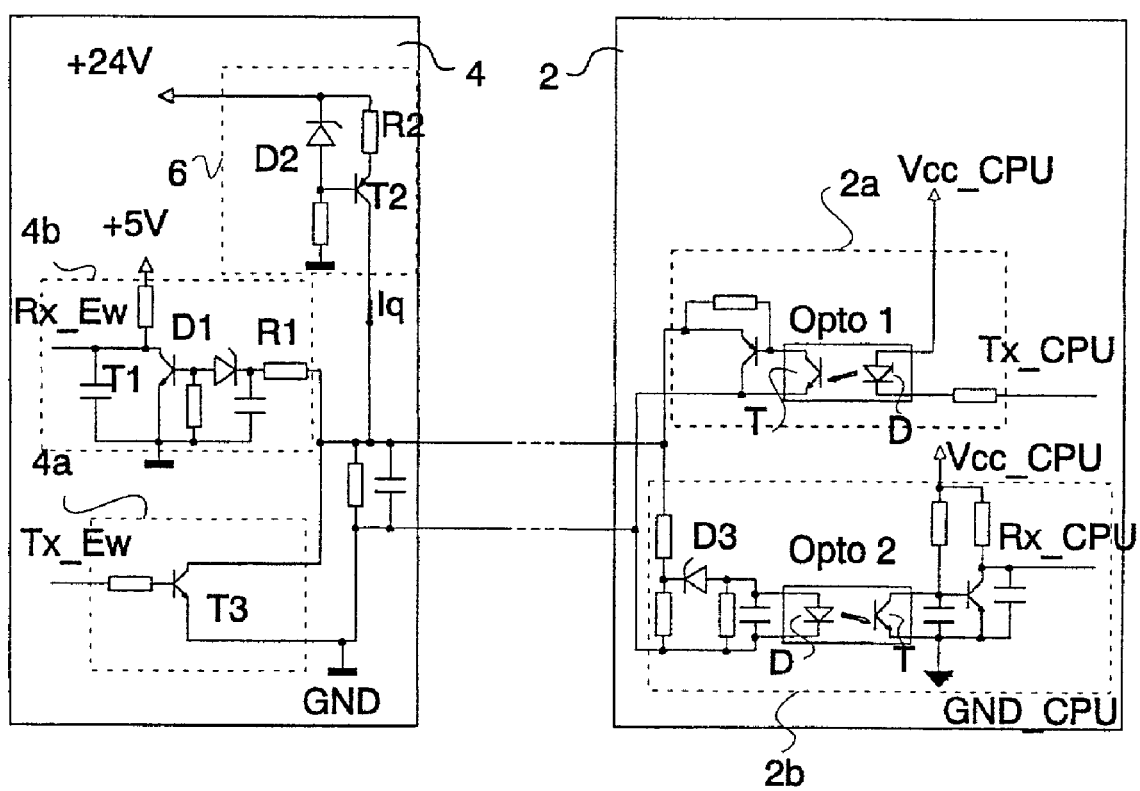
FIG. 3 shows a schematic representation of a data transmission system according to another embodiment of the present invention.

According to FIG. 1, a data transmission system according to the present invention includes two circuit parts which can be interconnected via a two-pole line 8.

A first circuit part 2 is used for the coupling to a basic unit 1 (master), in particular, a programmable small control system such as logic relays or the like. A small control system of that kind includes, in particular, a microcontroller, a display unit, an operating control unit, signal inputs and signal outputs, the processing unit, the display screen, the operating control unit, the signal inputs and the signal outputs being accommodated in a common housing.

A second circuit part 4 is used for the coupling to an expansion unit 3 (slave) which can be connected to basic unit 1. Circuit parts 2 and 4 can be integrated in the respective devices 1 and 3 or designed as separate circuit modules.

Circuit part 2, which is assigned to basic unit 1, is composed of a transmitter circuit part 2a and a receiver circuit part 2b, the two elements being preferably designed in such a manner that a galvanic separation between inputs and outputs of the circuit parts is guaranteed. Circuit part 4, which is assigned to expansion unit 3, is also composed of a transmitter circuit part 4a and a receiver circuit part 4b. In the exemplary embodiment shown, moreover, a power supply 6 is integrated in the circuit part 4 assigned to expansion unit 3. Alternatively, power supply 6 can also be external or configured in circuit part 2 of basic unit 1.

Circuit parts 2, 4 can be interconnected via two-pole connecting line 8, one of the lines 8a carrying a reference potential, here ground (GND), and the other line 8b being used as a data transmission line. The data is transmitted by the two devices 1, 3 via the only data line 8b, which is therefore intended for the bidirectional data traffic. An appropriate communication protocol ensures that a collision of data is prevented. According to the present invention, a current Iq (preferably a constant current) is impressed upon data line 8*b* via power supply 6. This current Iq is used, in addition to the data transmission, for the power supply to the galvanically separated subsections of connected circuit parts 2*a*, 2*b*. Moreover, the current (Iq) makes it possible that, depending on input signals of the transmitter circuit parts of one device 1,3, received signal conditions of the other device 3,1 can be changed.

Design of the circuit configuration according to FIG. 2:

Transmitter- and receiver circuit parts 4*a*, 4*b* of circuit part 4 assigned to expansion unit 3 each have a semiconductor switch T1, T3, which may be an n-p-n switching transistor. In this connection, transmitter terminal Tx_Ew is connected via an ohmic resistance to the base of a transistor T3. The emitter of transistor T3 is connected to reference potential ground (GND) and connectable via reference potential line 8*a* to circuit part 2 assigned to basic unit 1. The collector of transmitter resistor T3 is connected, via a Zener diode D1 and a resistor R1 connected in series thereto, to the base of transistor T1 of receiver circuit part 4*b* and is moreover connected to power supply 6 for the purpose of current impression. Via the collector of transistor T3, moreover, circuit part 4, which is assigned to expansion unit 3, is connectable via data transmission line 8*b* to circuit part 2, which is assigned to basic unit 2. Receiver terminal Rx_Ew may include the collector of transistor T1, the collector being pulled to 5V via a pull-up resistor. The emitter of transistor T1 is connected to ground potential.

Power supply 6 may include by a p-n-p transistor T2 which is connected on the emitter side to a supply potential (here 24 V) via an ohmic resistor R2, transistor T2, on the base side, being also connected to the supply potential via a Zener diode D2 as well as to the reference potential via a further ohmic resistor and, via its collector terminal, to data transmission line 8*b*.

In a simplified embodiment, it is also possible for the power supply to be constituted by an ohmic resistor which is connected to a supply potential via one end and to data transmission line 8*b* via the other end. The power supply is advantageously integrated in slave device 3.

The base of transistor T2 is supplied via a voltage divider including a Zener diode D2 and a resistor, Zener diode D2 being connected to +24V on the cathode side and to ground potential via the resistor on the anode side.

Transmitter- and receiver circuit parts 2*a*, 2*b* of circuit part 2 assigned to basic unit 1 may also built with semiconductor switches Opto1, Opto2. In the embodiment shown, these semiconductor switches are designed as circuit elements which ensure a galvanic separation, preferably as optocouplers Opto1, Opto2. Receiver circuit part 2*b* includes an optocoupler (Opto2) which is connected to ground potential via its emitter on the transistor side (with n-p-n transistor stage). The collector is connected to Vcc potential (here approximately 5V) via a pull-up resistor and, at the same time, is included in the receiver terminal RX_CPU on the side of the basic unit.

On the diode side, optocoupler Opto2 is connected via its cathode to the emitter of optocoupler (with n-p-n transistor stage) Opto1 of transmitter circuit part 2*a* and is connectable to circuit part 4 of expansion unit 3 via reference potential line 8*a*. Via its anode, optocoupler Opto2 of receiver circuit part 2*b* is connected to the collector of optocoupler Opto1 of transmitter circuit part 2*a* via a Zener diode D3 arranged in forward conducting direction and is connectable to circuit part 4 of expansion unit 3 via data transmission line 8*b*.

On the diode side, the anode of optocoupler Opto1 is connected to transmitter input Tx_CPU via a resistor. On the cathode side, optocoupler Opto1 is connected to ground potential.

Mode of operation of the circuit configuration according to FIG. 2:

In the rest state of the data transmission system, output transistors T3 or T_Opto1 (transistor of optocoupler Opto1) of the two transmitter circuit parts 2*a*, 4*a*, respectively, are blocked (collector-emitter path non-conducting). Impressed current Iq is divided between the two receiver circuit parts 2*b*, 4*b*. In this context, the data transmission system may be dimensioned in such a manner that the largest portion of the current flows through data transmission line 8*b* and through the receiver circuit part 2*b* (D3, D_Opto2 (diode of second optocoupler Opto2)) assigned to basic unit 1. In this manner, the susceptibility to failure of the circuit is minimized.

In power supply 6, featuring Zener diode D2 and transistor T2, the current is:

$$Iq = V_{R2}/R2 = (V_{D2} - V_{EB\_T2})/R2$$

Zener diode D3 determines the voltage level of data transmission line 8*b* in the rest state (signal inactive, logical "0"):

$$V_{L\_REST} = V_{D3} + V_{D\_Opto2}$$

The current through receiver circuit part 4*b* assigned to expansion unit 3 is determined by Zener diode D1 and resistor R1:

$$I1 = V_{R1}/R1 = (V_{L\_REST} - V_{D1} - V_{BE\_T1})/R1$$

The data flow then takes place as follows:

Transmitter Circuit Part 2*a*/Basic Unit 1 Transmitting-Receiver Circuit Part 4*b*/Expansion Unit 3 Receiving:

As long as the transmitted bit is logically "0" (Tx_CPU=0), data transmission line 8*b* remains inactive, that is in the rest state as described above.

If the intention is to transmit a "1"-signal, then output transistor T_Opto1 of transmitter circuit part 2*a* opens and the entire current Iq flows back from power supply 6 to the ground potential via data transmission line 8*b*, transistor T_Opto1 and the ground line (reference potential line 8*a*). The voltage level of data transmission line 8*b* is nearly 0V (collector-emitter voltage of optocopler Opto1 in the enabled condition $V_{CE\_SAT\_T\_Opto1} \approx 0.2V$).

Since current can no longer flow through Zener diode D1 via R1 and the base T1 (D1 is blocked), receiver transistor T1 flips states (blocks, Rx_Ew=1) so that receiver terminal Rx_Ew of expansion unit 3 switches from logical 0 to logical 1.

At the same time, current no longer flows through Zener diode D3 and diode D_Opto2 of optocoupler Opto2, and the transistor of receiver optocoupler T_Opto2 flips states as well (blocks, Rx_CPU=1). In this manner, basic unit 1 gets feedback which can be used for checking purposes.

Transmitter Circuit Part 4*a*/Expansion Unit 3 Transmitting-Receiver Circuit Part 2*b*/Basic Unit 1 Receiving:

As long as the transmitted bit is logically "0" (Tx_CPU=0), data transmission line 8*b* remains inactive, that is in the rest state as described above.

If the intension is to transmit a "1"-signal, then transmitter transistor T3 in the expansion module opens and the entire current Iq flows from power supply 6 to the ground potential via transistor T3. The voltage level of data transmission line 8*b* is nearly 0V (collector-emitter voltage of enabled transistor T3 $V_{CE\_SAT\_T\_T3} \approx 0.2V$).

Since current can no longer flow through Zener diode D3 and diode D_Opto2 of optocoupler Opto2 (D3 is blocked), transistor T_Opto2 of optocoupler Opto2 flips states and blocks so that the signal changes from logical 0 to logical 1 at receiver terminal Rx_CPU of the basic unit.

At the same time, current no longer flows through Zener diode D1 via R1 and the base of T1 either, and receiver transistor T1 blocks as well so that the signal changes from logical 0 to logical 1 at receiver terminal Rx_Ew of expansion unit 3. In this manner, expansion unit 3 gets feedback which can be used for checking purposes.

According to the present invention, the data transmission system is designed in such a manner that the normal working currents are also used as "power supply" for the galvanically separated circuit parts of the basic unit which are located on the side of the connecting line (bus side). This configuration is particularly suitable for asynchronous transmission modes.

In practice, additional components in the form of filters and amplifier stages are needed. A circuit which is optimized in this manner is illustrated in FIG. 3.

In an embodiment of the present invention, transmitter- and receiver circuit parts (2a, 2b) are designed as elements which ensure a galvanic separation, and may be optocouplers (Opto1, Opto2). Transmitter- and receiver circuit parts (4a, 4b) may be designed in the form of transistor stages.

The present invention is not limited to the embodiments described above but includes all variations within the scope of the appended claims. Thus, the present invention can also be implemented using other semiconductor switch elements, operational amplifiers, or the like.

What is claimed is:

1. A data transmission system for serial asynchronous data transmission between a first unit and a second unit, the data transmission system comprising:
    a first circuit part associated with the first unit, the first circuit part including:
    a first transmitter circuit part connected to a first transmitter terminal of the first unit;
    a first receiver circuit part connected to a first receiver terminal of the first unit;
    a first terminal for a data transmission line; and
    a first terminal for a reference potential line;
    a second circuit part associated with the second unit, the second circuit part including:
    a second transmitter circuit part connected to a second transmitter terminal of the second unit;
    a second receiver circuit part connected to a second receiver terminal of the second unit;
    a second terminal for the data transmission line; and
    a second terminal for the reference potential line;
    the second circuit part being interconnectable with the first circuit part via the data transmission line such that the data transmission line directly connects the first transmitter circuit part, first receiver circuit part, second transmitter circuit part, and second receiver circuit part for bidirectional data transmission; and
    a current source configured for feeding a current into the data transmission line so that:
    a first signal state of the first receiver terminal is capable of being changed as a function of a second signal state of the second transmitter terminal; and
    a third signal state of the second receiver terminal is capable of being changed as a function of a fourth signal state of the first transmitter terminal,
    wherein the current source is a power supply to the first transmitter circuit and first receiver circuit of the first circuit part.

2. The data transmission system as recited in claim 1 wherein at least the first unit includes a programmable small control system including:
    a processing unit;
    a display unit;
    an operating control unit,
    a plurality of signal inputs; and
    a plurality of signal outputs;
    the processing unit, the display unit, the operating control unit, the plurality of signal inputs and the plurality of signal outputs being disposed in a common housing.

3. The data transmission system as recited in claim 2 wherein the processing unit includes a microcontroller.

4. The data transmission system as recited in claim 1 wherein:
    the first unit is a separate module configured for connecting to a programmable small control system, the programmable small control system including a processing unit, a display unit, an operating control unit, a plurality of signal inputs and a plurality of signal outputs, the processing unit, the display unit, the operating control unit, the plurality of signal inputs and the plurality of signal outputs being disposed in a common housing; and
    the second unit is a separate module configured for connecting a device, which expands a function of the first unit.

5. The data transmission system as recited in claim 4 wherein the processing unit includes a microcontroller.

6. The data transmission system as recited in claim 1 wherein the current source is integrated in the second unit.

7. The data transmission system as recited in claim 1 wherein each of the first and second transmitter and receiver parts include at least one respective semiconductor switch.

8. The data transmission system as recited in claim 1 wherein the current source includes an ohmic resistor connected to a supply potential with a first end thereof and to the data transmission line with a second end thereof.

9. A data transmission system for serial asynchronous data transmission between a first unit and a second unit, the data transmission system comprising:
    a first circuit part associated with the first unit, the first circuit part including:
    a first transmitter circuit part connected to a first transmitter terminal of the first unit;
    a first receiver circuit part connected to a first receiver terminal of the first unit;
    a first terminal for a data transmission line; and
    a first terminal for a reference potential line;
    a second circuit part associated with the second unit, the second circuit part including:
    a second transmitter circuit part connected to a second transmitter terminal of the second unit;
    a second receiver circuit part connected to a second receiver terminal of the second unit;
    a second terminal for the data transmission line; and
    a second terminal for the reference potential line;
    the second circuit part being interconnectable with the first circuit part via the data transmission line such that the data transmission line directly connects the first transmitter circuit part, first receiver circuit part, second transmitter circuit part, and second receiver circuit part for bidirectional data transmission; and
    a current source configured for feeding a current into the data transmission line so that:
    a first signal state of the first receiver terminal is capable of being changed as a function of a second signal state of the second transmitter terminal; and
    a third signal state of the second receiver terminal is capable of being changed as a function of a fourth signal state of the first transmitter terminal,
    wherein the first transmitter part and the first receiver part are configured so as to provide a galvanic separation between the first transmitter terminal and the first receiver terminal and between the first terminal for the data transmission line and the first terminal for the reference potential line.

10. A data transmission system for serial asynchronous data transmission between a first unit and a second unit, the data transmission system comprising:
a first circuit part associated with the first unit, the first circuit part including:
a first transmitter circuit part connected to a first transmitter terminal of the first unit;
a first receiver circuit part connected to a first receiver terminal of the first unit;
a first terminal for a data transmission line; and
a first terminal for a reference potential line;
a second circuit part associated with the second unit, the second circuit part including:
a second transmitter circuit part connected to a second transmitter terminal of the second unit;
a second receiver circuit part connected to a second receiver terminal of the second unit;
a second terminal for the data transmission line; and
a second terminal for the reference potential line;
the second circuit part being interconnectable with the first circuit part via the data transmission line such that the data transmission line directly connects the first transmitter circuit part, first receiver circuit part, second transmitter circuit part, and second receiver circuit for bidirectional data transmission; and
a current source configured for feeding a current into the data transmission line so that;
a first signal state of the first receiver terminal is capable of being changed as a function of a second signal state of the second transmitter terminal; and
a third signal state of the second receiver terminal is capable of being changed as a function of a fourth signal state of the first transmitter terminal,
wherein the current source includes a constant current source, and
wherein the current source includes a p-n-p transistor, the p-n-p transistor being connected to a supply potential via a first ohmic resistor on an emitter side of the p-n-p transistor, to the supply potential via a Zener diode on a base side of the p-n-p transistor, to the reference potential via a second ohmic resistor on the base side of the p-n-p transistor, and to the data transmission line via a collector terminal of the p-n-p transistor.

11. A data transmission system for serial asynchronous data transmission between a first unit and a second unit, the data transmission system comprising:
a first circuit part associated with the first unit, the first circuit part including:
a first transmitter circuit part including a first transmitter terminal;
a first receiver circuit part including a first receiver terminal;
a first terminal for a data transmission line; and
a first terminal for a reference potential line;
the first transmitter part and the first receiver part being configured so as to provide a galvanic separation between the first transmitter terminal and the first receiver terminal and between the first terminal for the data transmission line and the first terminal for the reference potential line;

a second circuit part associated with the second unit, the second circuit part including:
a second transmitter circuit part including a second transmitter terminal;
a second receiver circuit part including a second receiver terminal;
a second terminal for the data transmission line; and
a second terminal for the reference potential line;
the second circuit part being interconnectable with the first circuit part via the data transmission line for bidirectional data transmission and via the reference potential line; and
a current source configured for feeding a current into the data transmission line so that:
a first signal state of the first receiver terminal is capable of being changed as a function of a second signal state of the second transmitter terminal; and
a third signal state of the second receiver terminal is capable of being changed as a function of a fourth signal state of the first transmitter terminal.

12. A data transmission system for serial asynchronous data transmission between a first unit and a second unit, the data transmission system comprising:
a first circuit part associated with the first unit, the first circuit part including:
a first transmitter circuit part including a first transmitter terminal;
a first receiver circuit part including a first receiver terminal;
a first terminal for a data transmission line; and
a first terminal for a reference potential line;
a second circuit part associated with the second unit, the second circuit part including:
a second transmitter circuit part including a second transmitter terminal;
a second receiver circuit part including a second receiver terminal;
a second terminal for the data transmission line; and
a second terminal for the reference potential line;
the second circuit part being interconnectable with the first circuit part via the data transmission line for bidirectional data transmission and via the reference potential line; and
a current source comprising a p-n-p transistor, the p-n-p transistor being connected to a supply potential via a first ohmic resistor on an emitter side of the p-n-p transistor, to the supply potential via a Zener diode on a base side of the p-n-p transistor, to the reference potential via a second ohmic resistor on the base side of the p-n-p transistor, and to the data transmission line via a collector terminal of the p-n-p transistor, the current source being configured for feeding a current into the data transmission line so that:
a first signal state of the first receiver terminal is capable of being changed as a function of a second signal state of the second transmitter terminal; and
a third signal state of the second receiver terminal is capable of being changed as a function of a fourth signal state of the first transmitter terminal.

* * * * *